(12) United States Patent
Tokiwa et al.

(10) Patent No.: US 6,987,138 B2
(45) Date of Patent: Jan. 17, 2006

(54) BIODEGRADABLE POLYLACTIDE RESIN COMPOSITION

(75) Inventors: Yutaka Tokiwa, Ibaraki (JP); Takao Raku, Ibaraki (JP)

(73) Assignee: National Institute of Advanced Industrial Science & Technology, Tokyo (JP)

( * ) Notice: Subject to any disclaimer, the term of this patent is extended or adjusted under 35 U.S.C. 154(b) by 83 days.

(21) Appl. No.: 10/461,865

(22) Filed: Jun. 16, 2003

(65) Prior Publication Data

US 2004/0034128 A1 Feb. 19, 2004

(30) Foreign Application Priority Data

Jun. 17, 2002 (JP) .............................. 2002-175661

(51) Int. Cl.
*C08L 89/00* (2006.01)

(52) U.S. Cl. ............................. 524/17; 524/20; 524/21; 524/22; 524/25; 524/27

(58) Field of Classification Search ................ 524/17, 524/20, 21, 22, 25, 27
See application file for complete search history.

(56) References Cited

U.S. PATENT DOCUMENTS

| | | | |
|---|---|---|---|
| 3,636,956 A * | 1/1972 | Schneider .................... 606/224 |
| 4,997,819 A * | 3/1991 | Yamaguchi et al. .......... 514/54 |
| 5,798,435 A | 8/1998 | Gruber et al. |
| 6,121,410 A | 9/2000 | Gruber et al. |
| 6,248,361 B1 * | 6/2001 | Johnson et al. ............. 424/489 |
| 6,388,047 B1 | 5/2002 | Won et al. |
| 6,596,788 B2 * | 7/2003 | Kawamura et al. .......... 523/124 |
| 6,632,925 B1 * | 10/2003 | Zhang et al. ................ 530/370 |
| 6,733,787 B2 * | 5/2004 | Peterson et al. ............. 424/486 |
| 6,806,353 B2 * | 10/2004 | Zhang et al. ................ 530/370 |
| 2003/0079654 A1 | 5/2003 | Tokiwa et al. |

FOREIGN PATENT DOCUMENTS

| | | |
|---|---|---|
| EP | 1 033 127 A1 | 9/2000 |
| JP | 5-320524 | 12/1993 |
| JP | 5-331315 | 12/1993 |
| WO | WO 91/06286 | 5/1991 |
| WO | WO 99/11699 | 3/1999 |
| WO | WO 01/45742 A1 | 6/2001 |

OTHER PUBLICATIONS

European Search Report.
L. Mu et al. "Fabrication, characterization and in vitro release of paclitaxel (Taxol®) loaded poly (lactic-co-glycolic acid) microspheres prepared by spray drying technique and lipid/cholesterol emulsifiers" Journal of Controlled Release 76 (2001) pp. 239-254.
Jia K. Li et al. "A Novel Biodegradable System Based on Gelatin Nanoparticles and Poly (lactic-co-glycolic acid) Microspheres for Protein and Peptide Drug Delivery", Journal of Pharmaceutical Sciences, vol. 86, No. 8, Aug. 1997, pp. 891-895.

* cited by examiner

*Primary Examiner*—Bernard Lipman
(74) *Attorney, Agent, or Firm*—Foley & Larder LLP

(57) ABSTRACT

This invention provides a novel rapidly biodegradable polylactide resin composition while maintaining the good mechanical strength and physical properties of polylactide. This biodegradable polylactide resin composition comprises at least one protein selected from silk, gelatin, keratin, elastin, gluten, zein, or soybean. This composition further comprises degraded mannan, and furthermore, a filler.

5 Claims, No Drawings

BIODEGRADABLE POLYLACTIDE RESIN COMPOSITION

TECHNICAL FIELD

The present invention relates to a novel biodegradable polylactide resin composition, and more particularly to a novel biodegradable polylactide resin composition, which has significantly enhanced the biodegradability of polylactide without deteriorating its good mechanical and physical properties.

BACKGROUND ART

Polylactide can be produced from plants and its strength and physical properties are relatively better than those of other biodegradable resins. Accordingly, polylactide has rapidly become a focus of attention as a material alternative to existing plastics or fibers that are made from petroleum.

However, the biodegradability of polylactide is lower than that of other commonly known biodegradable plastics such as polyhydroxybutyric acid, polycaprolactone, or polybutylene succinate. For example, the quantities of biodegradable plastic-degrading bacteria in these plastics can be represented by the following sequence: polyhydroxybutyric acid≧polycaprolactone>polybutylene succinate>polylactide. Unlike another commonly known biodegradable plastic, i.e., aliphatic polyester, polylactide is aliphatic polyester formed by an α-ester bond. Thus, polylactide has specific properties. For example, it is not degraded by a lipase, esterase, or polyhydroxybutyric acid-degrading enzyme.

Accordingly, polylactides, which are excellent in terms of ready biodegradability, are strongly desired particularly in markets in the fields of agriculture or civil engineering where rapidly biodegradable products such as multi-purpose films or vegetation nets are strongly desired.

Meanwhile, techniques have been proposed in the past wherein a naturally occurring polymer such as starch is blended into biodegradable aliphatic polyester in order to improve cost, formability, and biodegradability of products (e.g., JP Patent Publication (Kokai) Nos. 5-320524 A (1993) and 5-331315 A (1993)).

When these blending techniques as such are applied to polylactide, however, the good mechanical strength or physical properties thereof are lost. Thus, a polylactide resin composition useful as a material for multi-purpose films, vegetation nets, etc. could not be obtained.

An object of the present invention is to provide a novel rapidly biodegradable polylactide resin composition by overcoming drawbacks of the prior art while maintaining good mechanical strength and physical properties of polylactide.

The present inventors have conducted concentrated studies in order to attain the above object. As a result, they have found that a polylactide resin composition having excellent biodegradability can be obtained while maintaining good physical properties and strengths of polylactide with the addition of a specific protein to polylactide or a mannan-containing polylactide composition. This has led to the completion of the present invention.

SUMMARY OF THE INVENTION

Specifically, the present invention provides the following:

(1) a biodegradable polylactide resin composition, which comprises at least one protein selected from silk, gelatin, keratin, elastin, casein, gluten, zein, or soybean protein;

(2) a biodegradable polylactide resin composition, which further comprises degraded mannan;

(3) the biodegradable polylactide resin composition according to (1) or (2) above, which further comprises a filler; and (4) the biodegradable polylactide resin composition according to any of (1) to (3) above, which comprises 0.01 to 5% by weight of the protein based on polylactide.

PREFERRED EMBODIMENTS OF THE INVENTION

The biodegradable polylactide resin composition according to the present invention comprises at least one protein selected from silk, gelatin, keratin, elastin, casein, gluten, zein, and soybean protein added to polylactide.

The polylactide used in the present invention is preferably poly-L-lactic acid, and poly-D-lactic acid may also be used. Alternatively, a mixture or copolymer of poly-L-lactic acid and poly-D-lactic acid may be used. Further, a copolymer, which incorporates therein a unit having biodegradability such as β-propiolactone, β-butyrolactone, pivalolactone, γ-butyrolactone, γ-methyl-γ-butyrolactone, γ-ethyl-γ-butyrolactone, glycolide, lactide, δ-valerolactone, β-methyl-δ-valerolactone, ε-caprolactone, ethylene oxide, or propylene oxide, may be used. In addition, generally commercially available biodegradable resins such as polyhydroxybutyric acid, polybutylene succinate, a polybutylene succinate-adipate copolymer, polycaprolactone, or polyester carbonate may be suitably blended into polylactide for the purpose of improving the physical properties thereof. The molecular weight of polylactide or a modified polymer thereof is 1,000 to 1,000,000, and preferably 10,000 to 100,000.

Examples of silk used in the present invention include a cocoon, a silk fibroin powder prepared by boiling a cocoon and removing water-soluble sericin, waste generated in the process of spinning silk fibers, waste generated in the process of producing silk fabric, waste of silk fabric, and a finely-cut silk fiber. Alternatively, the silk may comprise a finely shredded web, egg, larva, chrysalis, or adult silkworm moth insect or spider. For example, an oligomer that is prepared by hydrolyzing this silk, silkworm moth, spider, or waste thereof with an enzyme such as a protease or lipase or a chemical catalyzer such as acid or alkali may also be used.

Gelatin that is used in the present invention is generally derived from bovine sources, however, gelatin derived from poultry, porcine, fish, human, or similar sources may also be used without particular limitation on its origin. Gelatin is generally made from bone, but it may be made from skin, eyes, or the like. Although the use of gelatin is preferable, pulverized bone, ossein, collagen, or the like, which are raw materials for gelatin, can also be used. For example, an oligomer, which is prepared by hydrolyzing this gelatin, pulverized bone, ossein, or collagen with an enzyme such as a protease or lipase or a chemical catalyzer such as acid or alkali, may also be used.

Keratin that is used in the present invention is generally derived from poultry sources. However, keratin derived from bovine, porcine, fish, human, or similar sources may also be used without particular limitation on its origin. Keratin is generally made from poultry feathers, but it may be made from horns, hair, scales, or the like. For example, an oligomer, which is prepared by hydrolyzing this keratin with an enzyme such as a protease or lipase or a chemical catalyzer such as acid or alkali, may also be used.

Elastin that is used in the present invention is generally derived from bovine sources, however, elastin derived from poultry, porcine, fish, human, or similar sources may also be used without particular limitation on its origin. Elastin is generally made from the bovine neck ligament, but it may be made from arteries, skin, lungs, or the like. For example, an oligomer, which is prepared by hydrolyzing this elastin with an enzyme such as a protease or lipase or a chemical catalyzer such as an acid or alkali, may also be used.

Casein that is used in the present invention is generally derived from a milk protein, however, its origin is not particularly limited. For example, an oligomer, which is prepared by hydrolyzing this casein with an enzyme such as a protease or lipase or a chemical catalyzer such as acid or alkali, may also be used.

Gluten that is used in the present invention is generally derived from wheat, however, its origin is not particularly limited. For example, an oligomer, which is prepared by hydrolyzing this gluten with an enzyme such as a protease or lipase or a chemical catalyzer such as acid or alkali, may also be used.

Zein that is used in the present invention is a main protein of maize, however, the type of maize is not particularly limited. For example, an oligomer, which is prepared by hydrolyzing this zein with an enzyme such as a protease or lipase or a chemical catalyzer such as acid or alkali, may also be used.

The type of soybean protein that is used in the present invention is not particularly limited. Preferably, soybean protein is used in a powder state. Also, soybeans, which are simply ground without any special purification, for example, those separated through a 170 μm-sieve, are preferably used.

At least one protein, which is selected from the silk, gelatin, keratin, elastin, casein, gluten, zein, or soybean protein, is used solely or in combinations of two or more. Although the forms of these proteins are not particularly limited, it is preferable if they are finely ground and used as powders of 0.1 to 5000 μm for easy mixing with polylactide. It should be noted that the particle sizes are not particularly limited.

The protein content is not particularly limited, and it is 0.01 to 5% by weight, preferably 0.1 to 5% by weight, and more preferably 0.2 to 3% by weight, based on polylactide, from the viewpoint of maintenance of mechanical properties.

When the protein content is less than 0.01% by weight, the effect of accelerating biodegradability is significantly deteriorated. In contrast, protein content exceeding 5% by weight is undesirable since the mechanical properties and water resistance thereof are deteriorated.

The biodegradable polylactide resin composition according to the present invention comprises, as essential components, the polylactide and the protein. In order to accelerate biodegradability, the addition of degraded mannan is preferable.

The term "degraded mannan" used herein refers to a degradation product of mannan which is a compound having mannose as a constituent.

Mannan is a polysaccharide that is mainly constituted of mannose, and examples thereof are classified as follows.

Plant-derived mannan: examples thereof include those obtained from a coprameal of a coconut palm, coconut husk, a plant of a palm family, Huacra Palm, from South Africa, Chinese yam mannan, and yam mannan.

Glucomannan: a polysaccharide constituted by glucose and mannose, and examples thereof include those obtained from rhizomes of konjak yam, lily, narcissus, or lycoris.

Galactomannan: a polysaccharide constituted by galactose and mannose, and examples thereof include those obtained from Locust bean gum, spino gum, galactomannan of coffee bean, soybean derived from soybean seed coat, tamson gum, Tara gum, or Guar gum.

Mannan comprises two or more saccharides as constituents besides mannose, and examples thereof include D-galacto-D-gluco-D-mannan contained in a xylem of a conifer and mannan obtained from xanthane gum, etc.

The degraded mannan used in the present invention can be obtained by degrading the aforementioned various mannans in a desirable method. Examples of known methods for degrading mannan include: a biochemical degradation method wherein degradation is carried out directly using polysaccharide degrading enzymes (e.g., mannanase, galactomannanase, or glucomannanase) or bacteria producing the enzymes; a chemical degradation method wherein degradation is carried out using acid, alkali, or the like; and a physical degradation method wherein high-speed stirring, a shearing machine, or the like is employed. In the present invention, degraded mannan that is degraded and produced by these methods may be obtained by any desirable degradation methods, and it is not necessarily obtained through any of the aforementioned degradation methods.

Specific examples of degraded mannan include: β-1,4-mannooligosaccharides such as β-1,4-mannobiose, β-1,4-mannotriose, β-1,4-mannotetraose, or methyl β-mannoside; β-1,6-galactomannooligosaccharides prepared by binding one or two branched galactose to β-1,4-mannobiose, β-1,4-mannotriose, or β-1,4-mannotetraose; degraded galactomannan of oligosaccharide, etc., obtained by degrading α-1,4-galactomannooligosaccharide, α-1,6-galactomannooligosaccharide, α-1,3-galactomannooligosaccharide, copra cake, Guar gum, or Locust bean gum with mannanase; oligosaccharide prepared by binding glucose or maltose to β-1,4-mannobiose, mannotriose, or mannotetraose through a β-1,4-bond; and degraded glucomannan contained in konjak.

The biodegradable polylactide resin composition according to the present invention preferably comprises a filler in order to accelerate crystallization at the time of thermoforming, thereby improving the thermal tolerance and mechanical strength of the formed product. Examples of a filler include calcium carbonate, magnesium carbonate, calcium hydroxide, calcium oxide, magnesium oxide, aluminum oxide, silicon oxide, iron oxide, boron nitride, titanium oxide, talc, pyrophyllite clay, silicate pigment, polishing powder, mica, sericite, bentonite, pearlite, zeolite, wollastonite, fluorite, dolomite, quick lime, slaked lime, kaolin, chlorite, and diatomaceous earth.

If necessary, the biodegradalbe polylactide resin composition can suitably comprise auxiliary components such as a pigment, antioxidant, antistatic agent, delustering agent, coloring agent, aromatic, antiaging agent, fluorescent brightening agent, ultraviolet absorber, ultraviolet stabilizer, slip additive, filler, carbon black, thickener, chain extender, crosslinking agent, plasticizer, stabilizer, or viscosity stabilizer.

Further, starch or processed starch, pectin, chitin, chitosan, alginic acid, xylose, cellulose, or a cellulose derivative such as carboxymethylcellulose can be incorporated within a range that does not impede the function and the effect of the present invention.

The biodegradable polylactide resin composition according to the present invention can be prepared by adding silk, gelatin, keratin, elastin, or soybeans solely or in combinations of two or more to polylactide, followed by mixing while heating. More preferably, degraded mannan, a filler, or the like is added. In this case, a method for mixing while heating is not particularly limited. Examples thereof include: a method wherein at least one of silk powder, gelatin, keratin, elastin, casein, gluten, zein, or soybean protein is added to polylactide while heating it, followed by mixing using a kneading machine such as a roll mill; a method wherein they are kneaded in an extruding machine; blow molding; and foaming. Heating temperature is not particularly limited, and it is generally in the range of 140 to 200° C.

The biodegradable polylactide resin composition according to the present invention has significantly improved the biodegradability of polylactide while maintaining the good mechanical strength and physical properties thereof.

This biodegradable polylactide resin composition can be processed into a plate, cylinder, foam, or bottle by, for example, injecting it into an extrusion template at the time of heating. Alternatively, the composition can be dissolved in a solvent to form it into a membrane, sheet, or film.

Accordingly, the polylactide resin composition of the present invention can be suitably used for various applications. Examples thereof include: materials for agriculture and horticulture such as films for vinyl houses, films for tunnels, mulch films, vegetation films, seedling pots, plant seeders, or covering materials for fertilizers or pesticides; packaging materials such as vegetation nets, sandbags, mold forms for construction, sheets for civil engineering, trays for civil engineering materials such as large head nails, foamed trays, stretch films, shrink films, beverage bottles, or toothbrush blisters; materials for fisheries such as fish nets, layer nets, nets for cultivation, fishing lines, or fishing bait bags; waterproof sheets for disposable diapers or sanitary items; medical equipment such as packaging materials or injection syringes; daily necessities and miscellaneous goods such as garbage bags, shopping bags, plastic bags, draining nets, plates, laminated containers for forks and spoons, binding tape, handles of toothbrushes or razors, shampoo or rinse bottles, cosmetics bottles, pens, or markers; medical materials such as bone connecting materials, surgical dressing, and wound covering materials; and other various applications such as air filters, magnetic cards, labels, release papers, or golf tees.

Products formed of the polylactide resins rapidly degrade and disappear in nature such as soil or water through the activities of microorganisms (bacteria) or enzymes, without generating harmful substances. Accordingly, they can be buried in soil or compost, or poured in water in a ground or unchanged state after use for their disposal.

The present invention is hereafter described in more detail with reference to examples and comparative examples, although the technical scope of the present invention is not limited thereto.

EXAMPLES

Example 1

Production of a Polylactide Plate Comprising Polylactide and Silk Powder

Poly-L-lactic acid (Lacty #9000, Shimadzu) was used. This polylactide, silk powder, and talc were mixed at a ratio of 96:2:2 by weight, and the mixture was then kneaded in a kneading machine, which was heated at 185° C. Further, the product was pelletized and then made into a sheet (thickness: 0.5 mm) using a heat press. Furthermore, dumbbell-shaped samples were cut from the sheet and then subjected to performance tests.

Example 2

Production of a Polylactide Plate Comprising Polylactide and Gelatin

Poly-L-lactic acid (Lacty #9000) was used. This polylactide, gelatin, and mannooligosaccharide were mixed at a ratio of 96:2:2 by weight. The mixture was made into a sheet, dumbbell-shaped samples were prepared therefrom, and the samples were then subjected to performance tests in the same manner as in Example 1.

Example 3

Production of a Polylactide Plate Comprising Polylactide and Keratin

Poly-L-lactic acid (Lacty #9000) was used. This polylactide, keratin, and mannooligosaccharide were mixed at a ratio of 96:2:2 by weight. The mixture was made into a sheet, dumbbell-shaped samples were prepared therefrom, and the samples were then subjected to performance tests in the same manner as in Example 1.

Example 4

Production of a Polylactide Plate Comprising Polylactide and Elastin

Poly-L-lactic acid (Lacty #9000) was used. This polylactide, elastin, and mannooligosaccharide were mixed at a ratio of 96:2:2 by weight. The mixture was made into a sheet, dumbbell-shaped samples were prepared therefrom, and the samples were then subjected to performance tests in the same manner as in Example 1.

Example 5

Production of a Polylactide Plate Comprising Polylactide and Casein

Poly-L-lactic acid (Lacty #9000) was used. This polylactide, casein, and talc were mixed at a ratio of 96:2:2 by weight. The mixture was made into a sheet, dumbbell-shaped samples were prepared therefrom, and the samples were then subjected to performance tests in the same manner as in Example 1.

Example 6

Production of a Polylactide Plate Comprising Polylactide and Gluten

Poly-L-lactic acid (Lacty #9000) was used. This polylactide, gluten, and talc were mixed at a ratio of 96:2:2 by weight. The mixture was made into a sheet, dumbbell-shaped samples were prepared therefrom, and the samples were then subjected to performance tests in the same manner as in Example 1.

Example 7

Production of a Polylactide Plate Comprising Polylactide and Zein

Poly-L-lactic acid (Lacty #9000) was used. This polylactide, zein, and talc were mixed at a ratio of 96:2:2 by weight. The mixture was made into a sheet, dumbbell-shaped samples were prepared therefrom, and the samples were then subjected to performance tests in the same manner as in Example 1.

Example 8

Production of a Polylactide Plate Comprising Polylactide and Soybean Protein Powder Poly-L-lactic acid (Lacty #9000) was used. This polylactide, soybean protein powder, and mannooligosaccharide were mixed at a ratio of 96:2:2 by weight. The mixture was made into a sheet, dumbbell-shaped samples were prepared therefrom, and the samples were then subjected to performance tests in the same manner as in Example 1.

Comparative Example 1

In the same manner as in Example 1, a polylactide composition was prepared without using silk powder, the composition was made into a sheet, dumbbell-shaped samples were prepared therefrom, and the samples were then subjected to performance tests (Lacty #9000:talc=98:2).

Comparative Example 2

In the same manner as in Example 2, a polylactide composition was prepared without using gelatin, the composition was made into a sheet, dumbbell-shaped samples were prepared therefrom, and the samples were then subjected to performance tests (Lacty #9000:mannooligosaccharide= 98:2).

The sheet-like polylactide resin compositions prepared in the examples and comparative examples were assayed concerning the following items to evaluate their physical properties and functions. The results are shown in Table 1.

1. Mechanical Properties

Breaking strengths and breaking elongations were assayed in accordance with the method specified by JIS K-7113. Assay was carried out at a temperature of 17° C. and a humidity of 50%. The results are shown in Table 1. Breaking strengths and breaking elongations were determined by the following equation.

Breaking strength($N/cm^2$)=breaking load ($N$)/cross section($cm^2$)

Breaking elongation(%)[(breaking elongation–span length)/span length]×100

TABLE 1

|  | Ex. 1 | Ex. 2 | Ex. 3 | Ex. 4 | Ex. 5 |
|---|---|---|---|---|---|
| Thickness (mm) | 0.501 | 0.492 | 0.502 | 0.495 | 0.498 |
| Breaking strength ($N/cm^2$) | 4850.8 | 4820.3 | 4820.1 | 4840.5 | 4895.2 |
| Breaking elongation (%) | 1.5 | 1.6 | 1.4 | 1.5 | 1.6 |

|  | Ex. 6 | Ex. 7 | Ex. 8 | Comp. Ex. 1 | Comp. Ex. 2 |
|---|---|---|---|---|---|
| Thickness (mm) | 0.502 | 0.498 | 0.501 | 0.503 | 0.497 |
| Breaking strength ($N/cm^2$) | 4880.3 | 4780.2 | 4870.3 | 4750.2 | 4730.1 |
| Breaking elongation (%) | 1.5 | 1.4 | 1.4 | 1.3 | 1.4 |

(Results of Example 1, Example 2, Example 3, Example 4, Example 5, Example 6, Example 7, Example 8, Comparative Examples 1, and Comparative Example 2 indicate the averages of 10 samples)

2. Evaluation of Biodegradability

Flat films (8 cm×8 cm, 5 mm-thick Example 1, Example 2, Comparative Example 1, and Comparative Example 2) were buried in soil (Tsukuba, Ibaraki), and biodegradabilities were investigated based on changes in weights. Decreased weights (rate of weight decrease, %) indicated levels of the biodegradation of the flat films. The results are shown in Table 2.

TABLE 2

| Biodegradability by being buried in soil | | | | | |
|---|---|---|---|---|---|
| Rate of weight decrease, % | | | | | |
|  | Ex. 1 | Ex. 2 | Ex. 3 | Ex. 4 | Ex. 5 |
| 0 hour | 0 | 0 | 0 | 0 | 0 |
| 1 month later | 20 | 25 | 20 | 22 | 21 |
| 2 months later | 33 | 38 | 30 | 31 | 28 |
| 3 months later | 45 | 55 | 42 | 38 | 34 |

| Rate of weight decrease, % | | | | | |
|---|---|---|---|---|---|
|  | Ex. 6 | Ex. 7 | Ex. 8 | Comp. Ex. 1 | Comp. Ex. 2 |
| 0 hour | 0 | 0 | 0 | 0 | 0 |
| 1 month later | 20 | 22 | 19 | 12 | 18 |
| 2 months later | 27 | 28 | 28 | 15 | 25 |
| 3 months later | 40 | 37 | 39 | 23 | 33 |

What is claimed is:

1. A biodegradable polylactide resin composition comprising silk powder.

2. A biodegradable polylactide resin composition comprising (i) at least one protein selected from silk, gelatin, keratin, elastin, casein, gluten, zein, and soybean protein and (ii) degraded mannan.

3. The biodegradable polylactide resin composition according to claim 2, further comprising a filler.

4. The biodegradable polylactide resin composition according to claim 2, comprising 0.01 to 5% by weight of the protein based on polylactide.

5. The biodegradable polylactide resin composition according to claim 3, comprising 0.01 to 5% by weight of the protein based on polylactide.

* * * * *